US007184878B2

(12) United States Patent
Malone et al.

(10) Patent No.: US 7,184,878 B2
(45) Date of Patent: Feb. 27, 2007

(54) ENGINE PROTECTION SYSTEM

(75) Inventors: Don Malone, Concord, OH (US); Renald Baron, Mentor, OH (US); George M. Daniels, Indian Mills, NJ (US)

(73) Assignee: Malone Specialty, Inc., Mentor, OH (US)

( * ) Notice: Subject to any disclaimer, the term of this patent is extended or adjusted under 35 U.S.C. 154(b) by 0 days.

(21) Appl. No.: 10/932,532

(22) Filed: Sep. 2, 2004

(65) Prior Publication Data

US 2005/0119821 A1 Jun. 2, 2005

Related U.S. Application Data

(60) Provisional application No. 60/499,828, filed on Sep. 3, 2003.

(51) Int. Cl.
G06F 19/00 (2006.01)
F02M 51/00 (2006.01)

(52) U.S. Cl. ...................... 701/112; 123/479

(58) Field of Classification Search ........... 701/101, 701/107, 112, 113, 114; 123/479
See application file for complete search history.

(56) References Cited

U.S. PATENT DOCUMENTS

| 4,053,368 A | 10/1977 | Courvoisier et al. |
| 4,381,744 A | 5/1983 | Terry |
| 4,475,493 A | 10/1984 | Masteller et al. |
| 4,488,521 A | 12/1984 | Miller et al. |
| 4,489,311 A | 12/1984 | Lang et al. |
| 4,691,675 A * | 9/1987 | Iwaki ................ 123/339.23 |
| 4,745,741 A * | 5/1988 | Masui et al. .............. 60/274 |
| 5,070,832 A * | 12/1991 | Hapka et al. ........... 123/198 D |
| 5,732,549 A * | 3/1998 | Treinies et al. .............. 60/274 |
| 6,055,470 A * | 4/2000 | Londot et al. .............. 701/35 |
| 6,415,761 B1 | 7/2002 | McKenzie |

OTHER PUBLICATIONS

Email printout—Engine Monitoring System/Controller with Remote Communications Capabilities—EMS 547 Copyright 2001 by FW Murphy.

* cited by examiner

*Primary Examiner*—John T. Kwon
(74) *Attorney, Agent, or Firm*—Fay Sharpe Fagan Minnich & McKee; Karl W. Hauber

(57) ABSTRACT

An engine protection system and protocol is implemented within an electronic control module. Various engine parameters, such as engine coolant level, coolant temperature, transmission fluid temperature, and engine oil pressure are monitored and compared to limit values to determine if a fault condition exists as to one or more of the parameters. The engine protection system includes visual and audible signals responsive to the parameters. An engine disabling mechanism is operative when any of the aforementioned parameters exceed predetermined limits for a predeterminable period. The electronic control module contains a memory function for recording the fault parameters as well as other identifying information. The electronic control module also includes an engine idle limiter feature. The engine disabling means is operative when the vehicle idling duration exceeds a second predeterminable period. The electronic control module further includes a battery voltage monitor with latching relay including a circuit interrupter operative when the battery voltage falls below a predetermined limit.

11 Claims, 7 Drawing Sheets

ENGINE PROTECTION SYSTEM

This application claims priority on U.S. Provisional Application Ser. No. 60/499,828 filed Sep. 3, 2003. This invention is related to control systems and protocols for protecting, monitoring, and/or recording one or more operating systems associated with internal combustion engines.

BACKGROUND OF THE INVENTION

The need to protect internal combustion engines from damaging or destructive operating conditions is essential for the proper operation of the engines. Continued operation of an engine under critical low oil pressure or low coolant conditions, for example, can lead to a catastrophic failure of the engine. Fluid monitoring and protection systems are used on engines to discourage operation of the engine when the operating conditions exceed and/or are below acceptable limits. In the past, various systems of varying degrees of sophistication have been developed to monitor critical fluid conditions in the engine, and/or other parameters, in order to implement an engine protection protocol. The following patents are incorporated herein by reference as background information with regard to engine protection and monitoring systems: U.S. Pat. No. 5,070,832 to Hapka, et al.; U.S. Pat. No. 4,429,670 to Ulanet; U.S. Pat. No. 4,488,521 to Miller, et al.

In perhaps the simplest prior art monitoring system, an analog gauge signals the advent of an unacceptable engine condition, for example, the low oil pressure light. Analog or digital gauges provide continuous readings of, for example, fluid levels and temperatures, but require constant monitoring by the driver. Additionally, these systems do not provide a download mechanism for retrieving and/or recording information regarding the type of engine problem, the total engine hours of operation (run time) at the time of shutdown or duration of time between engine problems, etc. Furthermore, existing systems typically rely on the driver to instinctively recognize the problem and take corrective or protective measures.

Aftermarket retrofit systems have been available that electronically monitor certain engine operating parameters. Typically, these systems work in conjunction with original factory installed engine systems. As such, the aftermarket systems are affected by or affect the existing factory systems, which can result in voiding the warranty on such OEM systems. Additionally, many of the retrofit systems can and are circumvented by component failures, wire disconnects, and/or operator manipulation.

Typical fault conditions or parameters include, but are not limited to, high fluid temperatures, low fluid levels, and low oil pressures. Existing systems and methods monitor these fluid parameters which are associated with engine abnormalities. However, fluid temperature, level, and/or pressure fault conditions are not the only parameters in which an engine protocol may be desirable or necessary. For example, a fault condition may exist where the fluid and engine parameters are functioning normally but the engine has idled for an excessive period of time. Excessive engine idling is bad for the environment because it increases air pollution, noise, and fuel use. It also increases the expense for fleet operators and consumers and contributes to an unpleasant atmosphere. Some states have taken measures to pass laws in which diesel trucks and buses are prohibited from idling for more than a specified period of time while the vehicle is stationary or parked. For example, the state of New York enacted the Environmental Conservation Law which prohibits diesel trucks and buses from idling for more than five consecutive minutes (three minutes in New York City) while the vehicle is stationary. Similarly, many other states have environmental laws prohibiting motor vehicles from idling more than a specified period of time (i.e. time periods typically range from 3 to 20 minutes). Current engine protection and monitoring systems do not provide a mechanism for automatically implementing an engine protocol when fluid parameters are normal but engine idle duration is beyond a specified and/or predeterminable parameter (i.e. fault condition).

In many of the aforementioned vehicles, electrical generators, i.e. alternators, are driven by the vehicular engine for both charging the vehicle battery and to supply electrical energy to other accessories in and about the vehicle. In many of such arrangements, the output of the electrical generator decreases significantly at relatively low engine speeds and is non-existent when the engine is shut down. With reference to the fault condition described above, wherein after excessive engine idling the engine is shut down, the vehicle accessories will be drawing electrical energy from the storage battery. Accordingly, it can be appreciated that it is important to maintain enough energy in the storage battery so as to be assured that the storage battery will have the required energy level when demand is placed thereon, for example, at engine start-up.

The invention as herein disclosed and described is directed to a system and protocol for monitoring engine parameters or conditions, controlling engine and accessory functions, and/or recording of certain fault variables. Additionally, the invention monitors and/or controls idle duration and/or electrical condition of the storage battery, as well as other related and attendant problems.

SUMMARY OF THE INVENTION

According to one aspect of the invention, a method is provided for controlling an internal combustion engine having an electronic control module with engine control routines. The method includes monitoring at least one engine parameter during operation of the engine; determining whether a fault condition exists as to the at least one parameter; initiating a fail safe mode when the at least one parameter is in the fault condition. The fail safe mode can include an engine shut down sequence, an audible alarm, and/or a visual alarm.

According to another and/or alternative aspect of the invention, an engine protection system is provided for an internal combustion engine associated with a vehicle. The system comprises an electronic engine control module, a mechanism for monitoring the magnitude of a number of engine fluid parameters, and/or a mechanism for monitoring duration of engine idling of a stationary vehicle. The system can also include a mechanism for determining whether a fault condition exists as to one or more of the fluid parameters by comparing the magnitude of one each of the number of fluid parameters to a number of limit values corresponding to the one each of the fluid parameters. Determining whether a fault condition exists as to the engine idling includes comparing the duration of the engine idling to a predeterminable number limit value. The engine protection system can include visual and/or audible signals on a panel monitor and/or an engine disabling mechanism. The system can also include an electronic control module that can have a microprocessor for recording and/or retrieving the fault condition data. The system can also include a mechanism for monitoring the magnitude of battery voltage and/or for determining whether a fault condition exists as to the battery voltage by comparing the magnitude of the battery voltage to a number limit value or other reference. The system further can include a latching relay with circuit interrupter operative when the battery voltage is in the fault condition for maintaining a minimum battery voltage.

An apparatus and method are provided for preserving battery power for engine start-up of an internal combustion engine. The apparatus and method can include an electronic control module with engine control routines. The control module can be used to monitor the battery voltage, determine whether a fault condition exists as to the battery voltage, and initiate an audible alarm and/or a visual alarm when the battery voltage is in the fault condition.

An apparatus and method are provided for reducing emissions and/or fuel consumption of an internal combustion engine. The apparatus and method can include an electronic control module. The control module can be used to monitor at least one engine parameter during operation of the engine and/or determine whether a fault condition exists as to the at least one parameter. The at least one parameter can include engine idle duration wherein a timer is actuated when the vehicle is stationary and/or the engine is running.

BRIEF DESCRIPTION OF THE DRAWINGS

The foregoing and other and advantages will in part be obvious and in part pointed out in the following description taken together with the accompanying drawings in which.

DESCRIPTION OF PREFERRED
EMBODIMENTS OF THE INVENTION

An engine protection system (EPS) provides for an engine monitoring device that can monitor fluid parameters such as, but not limited to, the engine coolant level, fuel level, transmission fluid, brake fluid, and/or engine oil, the temperature of one or more of these fluids, and/or the pressure of one or more of these fluids. The engine can be an internal combustion engine running on gasoline, diesel fuel, propane, natural gas, etc. It is to be appreciated that the EPS can optionally monitor other and/or additional fluid and non-fluid parameters such as, but not limited to, engine idle duration, battery voltage, storage compartment temperature, tire pressure, brake pad wear, wiper fluid levels, and/or other or additional parameters. The parameters exhibit fault conditions when the operative conditions, for at least a predeterminable period, exceed predetermined limits. The system can include a stand-alone independent unit which does not connect to or use any of the original equipment manufacturers (OEM) components or circuitry. As can be appreciated, the system can be designed alternatively to be partially or fully integrated by a vehicle manufacturer into a vehicle as an OEM component. Each circuit, to be described hereinafter, is designed as a closed loop type circuit which can be independent from the other circuits; however, this is not required.

Figure 1:
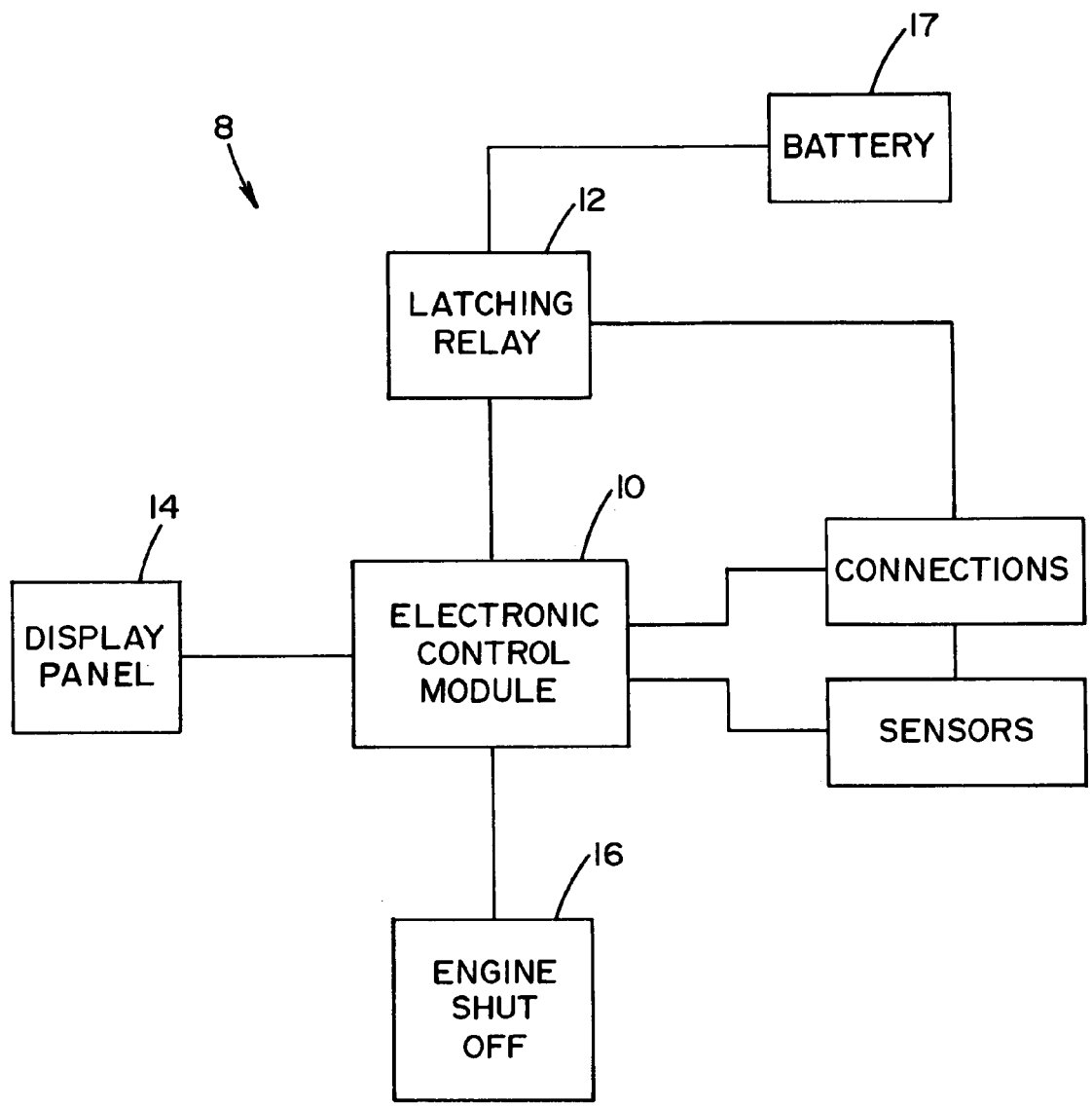
FIG. 1 is a schematic and diagrammatic illustration of the invention employed in one embodiment of the invention.
Figure 2:
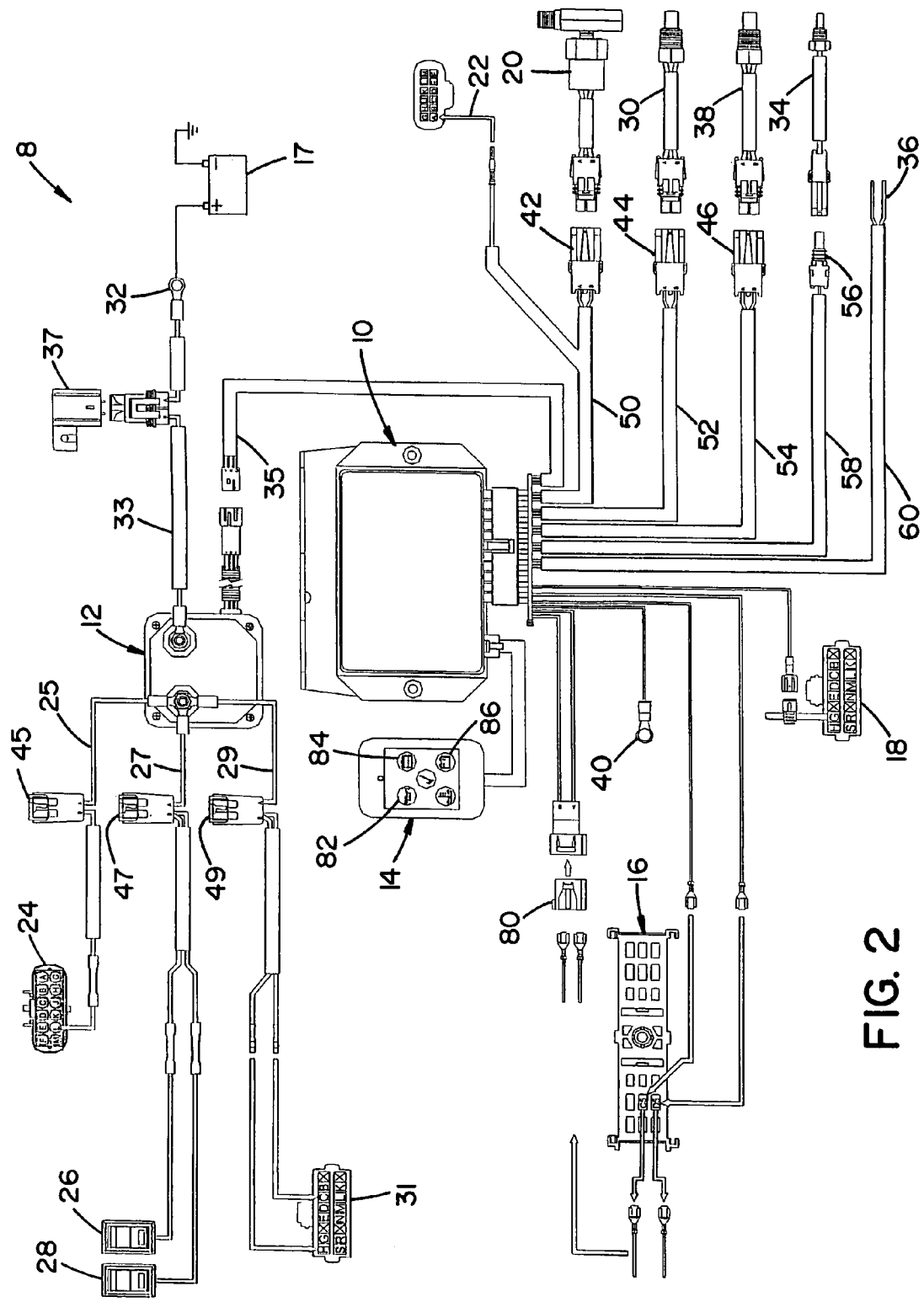
FIG. 2 is a schematic wiring diagram of another embodiment of the invention.

Referring now in greater detail to the drawings, wherein the showings are for the purpose of illustrating preferred embodiments of the invention only, and not for the purpose of limiting the same, an engine protection system can be equipped with a memory feature, an engine idle limiter, and a battery supervisor monitor with latching relay will be described. Referring to FIGS. 1 and 2, the engine protection system can be an engine monitoring device that monitors, for example, the engine coolant level, engine temperature, transmission fluid temperature, and the engine oil pressure. It is to be appreciated that other or additional parameters can be monitored, as described below. The system, when not an OEM component, is redundant to existing engine systems and does not affect and is not affected by the existing OEM systems. As such, the system can be designed so as to not feed back to OEM components nor cause problems to existing OEM components or circuitry.

Referring to FIG. 1, wherein the various components are represented by way of a schematic diagram. The components of the EPS 8 can comprise an electronic control module (ECM) 10, a latching relay 12, an enunciator panel and warning light display 14, engine shutdown connection 16, a battery or power supply 17, and a plurality of sensors and connections. As best shown in FIG. 2, the sensors and connections can include, but are not limited to the following: headlight monitor 18, oil level/pressure sensor 20, speed pulse input 22, dome light connection 24, box light connections 26, 28, engine temperature sensor 30, headlight connection 31, power supply connection 32, coolant level/temperature sensor 34, auxiliary or interior temperature sensor 36, transmission fluid level/temperature sensor 38, and a vehicle ground 40. The EPS 8 can also include an engine idle limiter and a battery supervisor monitor to be described in more detail hereinafter. The EPS 8 comprises all the associated wiring harnesses to connect two or more of these components together.

The ECM 10 can contain a memory function and timer which can record information each time the system detects a fault condition and each time the system has shut down the engine through any one of the designated monitoring devices. An engine shutdown sequence can be initiated when one of the designated parameters is in a fault condition. The ECM 10 provides data that is retrievable and can be associated with each of the circuits, as well as record, for example, the total engine hours of operation (run time) at the time of shutdown, and the device or devices that are in a fault condition, etc. The run time calculation utilizes the timer information which accumulates the elapsed time that the engine is running. The memory function of the ECM 10 retains the run time and adds to it every time the engine is started. Each ECM 10 can include a unique serial number that is displayed and recorded with the retrievable data, thereby assigning the data to a specific ECM 10 and its associated vehicle.

Referring again to FIG. 2, wherein an exemplary embodiment of a wiring diagram and connections for the aforementioned components is therein displayed. Sensors 20, 30, 38 are provided for monitoring oil level/pressure, engine temperature, and transmission fluid level/temperature, respectively. Switches 42, 44, 46 are integrated by way of connections 50, 52, 54 to the associated sensors 20, 30, 38 and the ECM 10. The coolant level/temperature sensor 34 is provided having a switch 56 and an electrical connection 58 to the ECM 10. The coolant level/temperature sensor 34 can include a 'splash filter' to minimize false signals. It is to be appreciated that the auxiliary sensor 36 can be connected to the ECM 10 by way of electrical connection 60 for monitoring the temperature of the interior box, i.e. cargo area, or alternatively can be used to monitor another parameter.

The control module 10 is supplied with constant power by way of connections 32, 33, 35 to the vehicle battery 17. The connection 33 is routed through the latching relay 12. In this manner, even when the ignition is turned off, the ECM 10 still has power for monitoring the voltage of the battery 17, through battery monitor 37, and triggering electrical shut down when the battery voltage falls below a specified limit. The latching relay 12 can also include connections 25, 27, 29 to the dome lights 24, the box lights 26, 28, and headlights 31, respectively. Fuses 45, 47, 49 are integrated with connections 25, 27, 29. The fuses 45, 47, 49 provide circuit protection when the current therein becomes excessive.

The EPS 8 can be initiated when an ignition switch 80 is activated to the "on" position. The EPS 8 can perform a self-test each time the system is initiated. The self-test typically takes a few seconds. The self-test examines each of the circuits to confirm that continuity is present and the system is functioning. After the EPS self-test, a low oil pressure audio alarm and warning light 82 can remain on until the engine is started. If the engine is not started within a predetermined period of time, the system will be in a shut down mode and will require cycling of the ignition switch 80 to reset. Cycling the ignition switch 80 involves turning the switch (key) to the off position and then to the on position. Once the engine starts, the oil pressure rises which cancels the audio alarm and warning light 82. If the oil pressure fails to rise, the audio alarm and warning light 82 will remain on and the ECM 10 will shut down the engine after the predetermined period of time has elapsed. Similar results occur from either high coolant temperature and/or low coolant level. A coolant alarm 84 can also have a time period delay in order to account for momentary low coolant level at start up thereby eliminating false alarms.

In operation, the engine protective system can function to detect any variance from the predetermined safe parameter limits of operation as it relates to pressures, temperatures, or levels which would result in opening of the associated sensor switch to thereby effect closing of an alarm relay switch in the ECM 10 to thereby activate the associated visual and audible alarms. Such predetermined safe parameter limits obviously include both minimums and maximums of, for example, pressures, temperatures and coolant level. To prevent engine damage due to continued operation under alarm inducing conditions, the control module 10 will function to open the shut-down circuit connector 16, breaking current flow to the engine's system, including current flow to a solenoid of a fuel valve, when the interrupted current flow is of a predetermined duration. Such shut-down circuit breakers are well known in the arts and the specific type relied on forms no part of this invention; for instance, a simple time delay relay means or a thermocouple means may comprise such shut-down circuit connector 16.

In particular, if one of the circuits described above operates outside of the predetermined design parameter, an associated audible and/or visual alarm is activated at the enunciator panel 14. The visual alarm can include a warning display check engine light and the fault circuit light or icon illuminates on the EPS display monitor 14 for a predetermined period of time. As shown in FIG. 2, the enunciator panel 14 includes an LED display. The icons are shown by way of example. Other, and more, icons can be integrated into panel 14 depending on system requirements. It is to be appreciated that the panel can include an LCD display. If the fault is corrected within the predetermined time frame (i.e. 30-seconds), the system will automatically reset. If one or more of the identified faults are not corrected, after the 30-second notification, the engine can be shut down, the alarm will stop, and/or the panel lights will change to a blink mode. Automatically shutting the engine down reduces the possibility of critical engine damage. After the system shuts down an engine, the lights on the display monitor are switched to blink mode which informs the operator that the EPS has shut the engine down. The panel monitor will remain in this mode until the system is reset. It is to be appreciated that the enunciator panel 14 can be mounted to the vehicle dashboard.

The EPS 8 can also include a bypass component wherein the alarm system functions as described above but the engine shutdown feature can be suspended or bypassed. For example, a bypass protocol for the EPS allows an operator to reset the engine protection system by shifting into neutral and restarting the engine (key off and then to start). This alternative provides additional time for the operator to remove the vehicle from traffic and/or place the vehicle in a safer orientation. To prevent costly engine damage, such emergency engine operation can be programmed for a limited time period. This alternative procedure can be implemented into the system and provides for another predeterminable interval prior to engine shutdown. In yet another alternative mode of operation, the time controlled engine shut down feature can be deactivated altogether wherein the audible and visual warnings are relied upon by the operator for taking appropriate action to protect the engine.

Referring again to FIG. 2, included within the ECM 10 is the engine idle limiter (EIL) feature. The ECM 10 can monitor the vehicle movements or lack thereof, through a speed (speedometer) pulse signal received through the speed input or sensor 22. Monitoring of the vehicle's movements can also include a transmission gear detector (i.e. "Park") or vehicle occupancy detector (not shown). The ECM 10 can activate a timer mechanism each time the vehicle becomes stationary. Stationary can be defined when there is no speed pulse signal being received through the speed pulse input 22. The microprocessor of the ECM 10 can be programmed with a specified idle limit duration, for example, to a 5, 10, 15, etc. minute duration. When a vehicle remains idling and stationary for a period longer than the pre-programmed time, the ECM 10 microprocessor will send a signal to the shutdown connection 16 which will start the shut down sequence of the engine, for example, 30 seconds prior to actual engine shut down, as discussed above. In this condition, typically the other fluid fault parameters 20, 30, 34, 38 are operating under normal conditions and the fault parameter identified includes an excessive period (longer than a predeterminable period) of time for engine idle. The EIL continuously monitors the duration of engine idle and can detect movement of the vehicle. Each time the vehicle moves, the EIL resets the timer to zero. After resetting, the timer can accumulate time when the vehicle is again becomes stationary with the engine running.

The EIL can have an initial start-up override or exemption option wherein the timer does not accumulate time until the vehicle has moved after initial start-up. It is to be appreciated that the initial start-up feature (override) is particularly advantageous in cold weather. This feature allows an operator to wait until a vehicle is fully warmed and ready for operation, i.e. windows defogged. Initial start-up can be defined as the first start of the day and/or whenever the vehicle has been re-started after a predeterminable period of shut down, i.e. ignition switch off for more than 60 minutes. The idle limit function is not enabled until the EIL senses a speed signal from speed pulse input 22 which indicates that the vehicle has moved. Following the initial start-up, the idle limit function can work all the time unless and until the key is turned off and the vehicle is left idle for more than 60 minutes, for example.

Another override or exemption feature can include a disabler to the idle limiter during periods of low or high ambient temperatures. Low ambient temperatures can be problematic for diesel fuel engines because of the "gelling" of diesel fuel at low temperatures. It is desirable to keep an engine running and the fuel warm during periods of low ambient temperature. Most of the Environmental Conservation Laws provide for exemptions to idle limits when the ambient temperature is below a specified temperature. A thermistor, (not illustrated) can be provided which senses ambient temperature and reads it as a resistance. The EIL can incorporate the resistance and when the reading is below a certain value, for example, 32 degrees Fahrenheit, the idle limit function will be disabled. When the temperature rises above 32 degrees, the idle limit will again be enabled. The ambient temperature limit can be a variable setting and predeterminable.

The identified fault parameters, i.e. threshold limit values, are predeterminable and programmable into the ECM 10. It is to be appreciated that differing operating parameters and/or different engine specifications may determine the fault parameters to be programmed. Furthermore, the ECM includes a memory function which records each incident or episode in which the system has shut down the engine through any or all of the designated monitoring devices, such as the EIL. The data recorded can then be downloaded with the use of, for example, a personal data assistant (PDA), computer or similar device, through an associated serial port, for example, SAERS 232 serial port. One example of a compatible PDA is the Palm OS™. Information programmed and recorded into the PDA can be in a fault code format. The coded format will detail each of the circuits and can record the total engine hours of operation (run time) at the time of each fault condition and engine shut down. The coded data that is recorded will be converted into a text content when read by the program contained in the PDA, computer, etc. The coded information, engine hours, and any text verbiage, is retained indefinitely or for a set period of time. Additionally, each ECM can include a unique serial number that can also be displayed with the recorded information and can be included in the printed data to identify the data with the associated vehicle.

Referring again to FIG. 2, the battery supervisor monitor 37 and the latching relay 12 can be integrated with the ECM 10. The battery monitor 37 continually monitors the voltage of the main battery 17. As can be appreciated from the wiring diagram in FIG. 2, if the engine is shut down and the battery voltage drops below the specified limit, the latching relay 12 can shut off power to, for example, the box lights 26, 28, the dome lights 24, and the headlights 31. The ECM 10 can include a fail-safe or override circuit, through the use of the oil pressure switch circuit 42, 50, which does not allow the ECM 10 to disconnect the accessories 24, 26, 28, 31 until the vehicle's engine is turned off. The battery monitor 37 is connected by way of connection 33 to the latching relay 12, and to which all of the accessory items (i.e. 24, 26, 28, 31) are electrically connected. Once the main battery 17 reaches a predetermined voltage or below, an audible alarm sounds and a battery warning light 86 may illuminate on the enunciator panel 14 for a period of approximately one minute, or any other predeterminable time period. If the voltage goes higher than the predetermined voltage within the one-minute time frame, the alarm and warning light 86 will shut off. If the engine is turned off and the voltage remains equal to or lower than the preset voltage, the ECM 10 will unlatch the relay allowing the power circuits 25, 27, 29 to be interrupted to the accessory items 24, 26, 28, 31. At that same time, the alarm will stop and the warning light 86 will change to a blink mode advising the driver that the system has been activated, relay unlatched, and the accessories turned off. At the point the relay 12 is unlatched, the main battery 17 retains adequate voltage to restart the vehicle, thus eliminating the need for a vehicle jump start caused by low battery voltage from the use of accessory items 24, 26, 28, 31 while the vehicle's engine is not running. In one embodiment, the latch relay 12 circuit requires approximately 8 milliamps of voltage to retain the latch relay in the locked position and requires approximately 25 milliseconds of power to trip the relay in either direction.

Figure 3A:
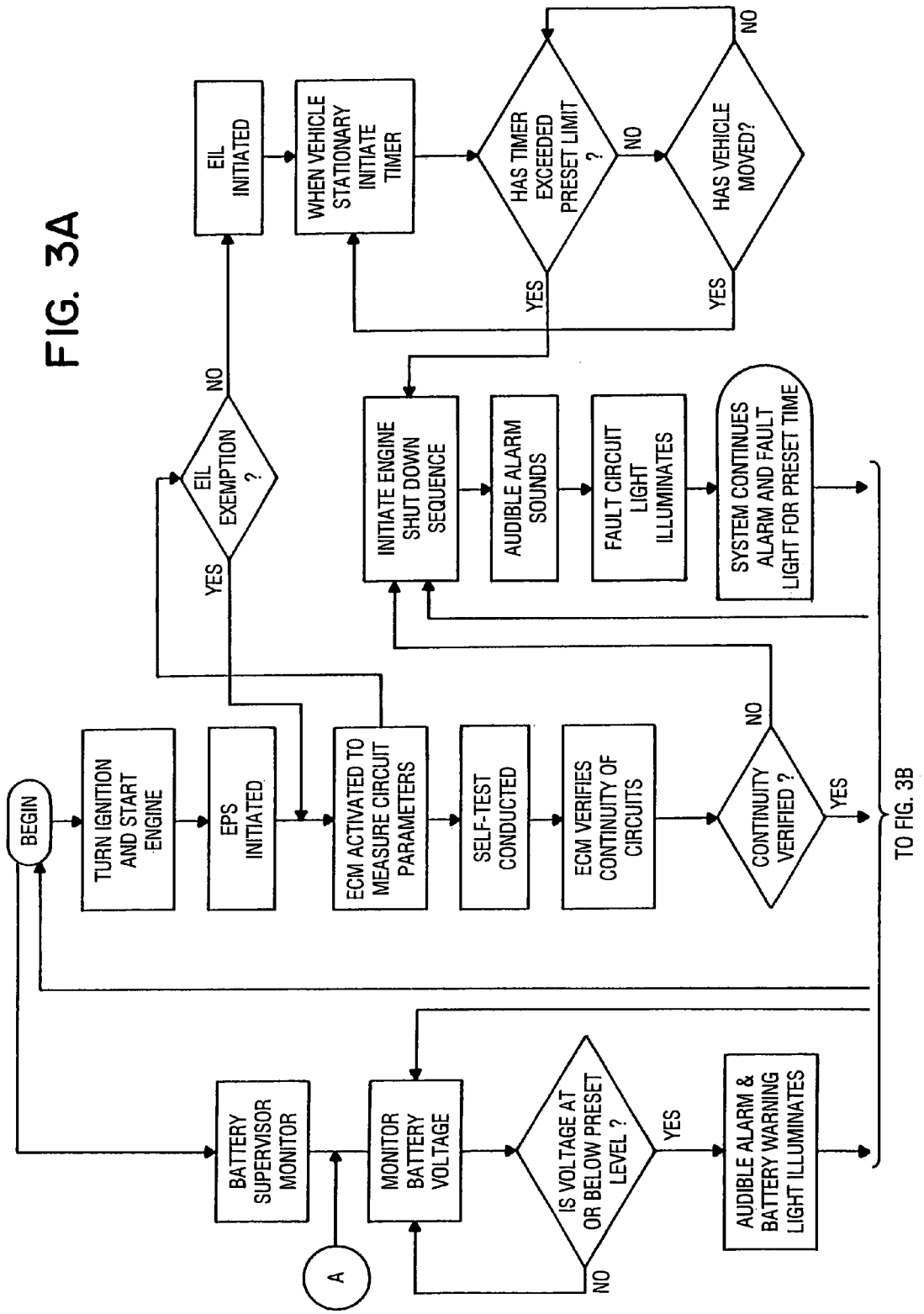
FIG. 3 is a flowchart of the engine protection protocol as executed by the engine protection system according to one embodiment of the present invention.
Figure 3B:
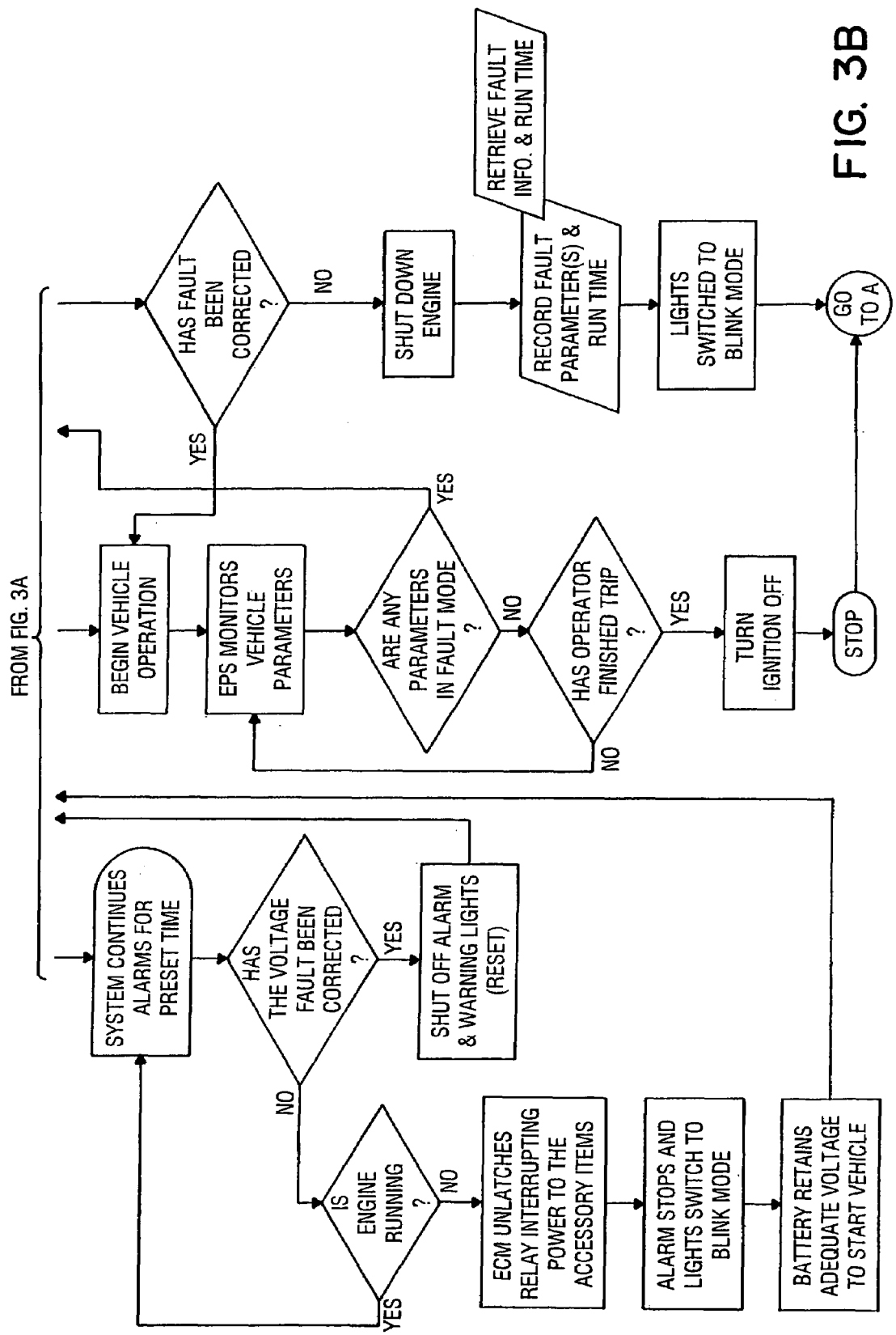

Referring now to FIG. 3, wherein a flow diagram is depicted showing the method of operation for the EPS. The steps in operating the EPS are displayed in the flow chart of FIG. 3, and the method generally follows the steps identified in the flow chart as described. An operator turns the ignition switch to the on position and starts the vehicle engine. At engine start up, the EPS is initiated and the ECM is activated to measure circuit parameters. The ECM can suspend EIL initiation if an exemption condition exists as described above. A self-test is conducted to verify continuity of all circuits. If continuity is not verified, the system can initiate an engine shut down sequence. If continuity is verified, the operator will begin vehicle operation. The EPS monitors vehicle parameters during operation. If any of the parameters move outside of predetermined limits and into a fault mode, the system can initiate the engine shut down sequence. The shut down sequence can include an audible alarm and illumination of a fault circuit light. The audible alarm and fault circuit light continues for a preset time. If the fault is corrected, the alarms are shut down and the system continues monitoring the vehicle parameters. If the fault has not been corrected, an engine shutdown sequence is then initiated. The engine protection system then records the associated fault parameter and engine run time. The lights on the enunciator panel can then be switched to blink mode, signifying that the engine protection system shut down the engine. The battery supervisor monitor monitors the battery voltage. If the voltage falls below a preset level, an audible alarm and battery warning light illuminates. The system continues the alarms for a preset period of time. If the voltage fault has not been corrected, the ECM can determine if the engine is running. If the engine has been turned off, the ECM unlatches the relay interrupting power to the accessory items. The audible alarm can be stopped and the lights switched to blink mode on the enunciator panel. At the point of interrupting power to the accessory items, the battery retains adequate voltage to start the vehicle. If the engine is running, the ECM can discontinue the audible alarm and change the fault light illumination to blink mode, but will not interrupt power to the electrical accessories. As long as the parameters do not result in fault mode, the ECM continues to monitor the parameters until the operator has finished the trip. Once the trip is finished, the operator will turn the ignition off and exit the vehicle. It is to be appreciated that the battery supervisor monitor continually monitors the battery voltage.

Figure 4:
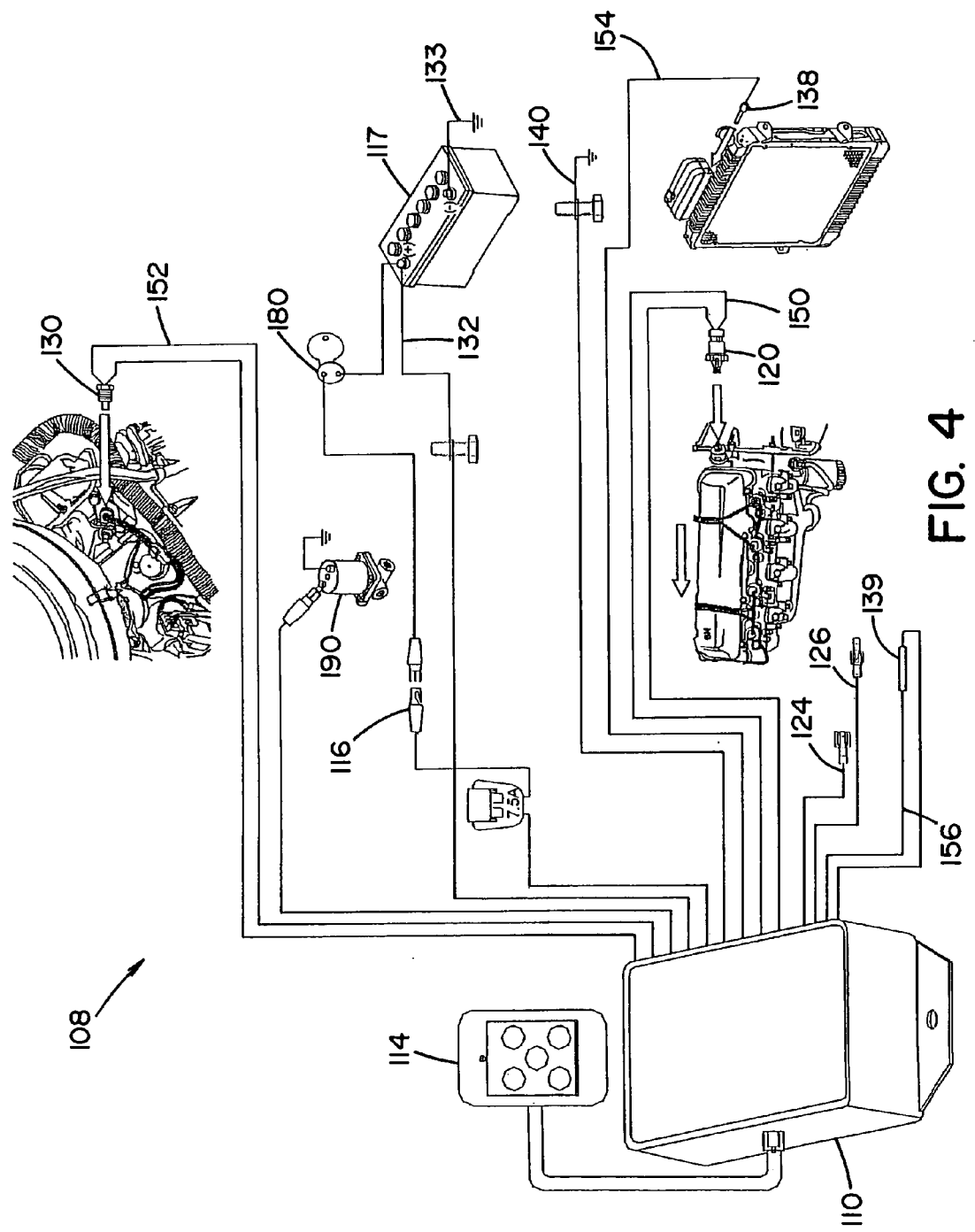
FIG. 4 is a schematic and diagrammatic illustration of still another embodiment of the invention.

Referring to FIG. 4, wherein another embodiment of a wiring diagram for an engine protection system 108 is therein displayed. Sensors 120, 1130, 1138, 139 are provided for monitoring oil level/pressure, coolant temperature, coolant level, and transmission temperature, respectively. The sensors 120, 130, 138, 139 are integrated by way of connections 150, 152, 154, 156 to an ECM 110. It is to be appreciated that other auxiliary sensors, as described above, can be connected to the ECM 110. The ECM 110 can also include a vehicle ground 140.

The control module 110 is supplied with constant power by way of connection 132 to the vehicle battery 117. The battery can be grounded by way of connection 133. In this manner, even when the ignition is turned off, the ECM 110 still has power for monitoring electrical systems and triggering alarms when any one of the systems is left on when the engine is turned off. For example, the electrical systems can include a headlight monitor 124, door ajar monitor 126, or other optional input switch.

The EPS 108 can be initiated when an ignition switch 180 is activated to the "on" position. The EPS 108 can perform a self-test each time the system is initiated as described above. In operation, the engine protective system 108 can function to detect any variance from the predetermined safe parameter limits of operation as it relates to pressures, temperatures, or levels which would result in opening of the associated sensor switch to thereby effect closing of an alarm relay switch in the ECM 110 to thereby activate the associated visual and audible alarms. To prevent engine damage due to continued operation under alarm inducing conditions, the control module 110 will function to open a shut-down circuit connector (not shown), breaking current flow to the engine's system, including current flow to a solenoid of a fuel valve 190, when the interrupted current flow is of a predetermined duration. Such shut-down circuit breakers are well known in the arts and the specific type relied on forms no part of this invention; for instance, a simple time delay relay means or a thermocouple means may comprise such shut-down circuit connector 116.

Figure 5:
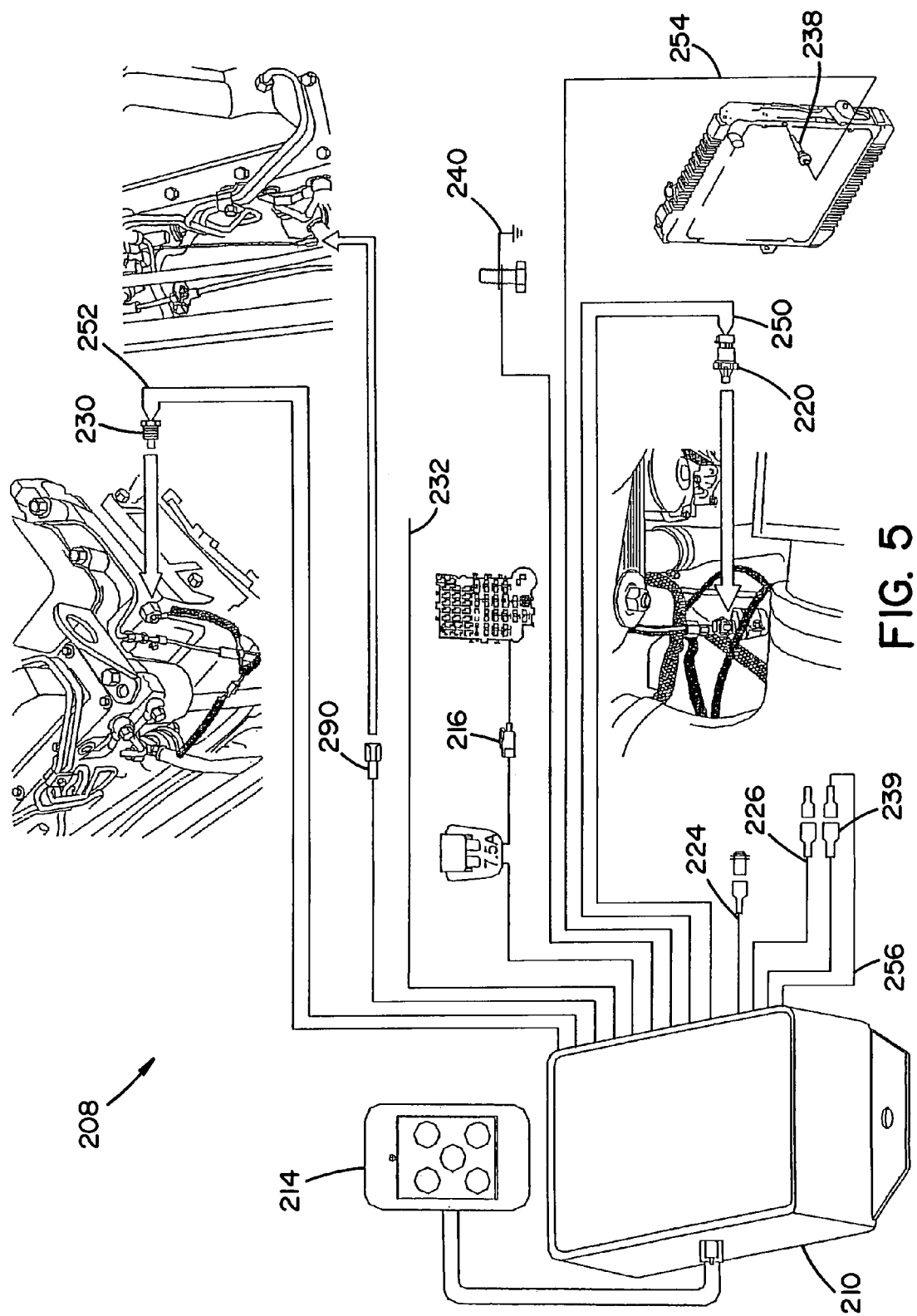
FIG. 5 is a schematic and diagrammatic illustration of yet another embodiment of the invention; and, FIG. 6 is a schematic and diagrammatic illustration of still yet another embodiment of the invention.

Referring to FIG. 5, wherein another embodiment of a wiring diagram for an engine protection system 208 is therein displayed. Sensors 220, 230, 238, 239 are provided for monitoring oil level/pressure, coolant temperature, coolant level, and transmission temperature, respectively. The sensors 220, 230, 238, 239 are integrated by way of connections 250, 252, 254, 256 to an ECM 210. It is to be appreciated that other auxiliary sensors, as described above, can be connected to the ECM 210. The ECM 210 can also include a vehicle ground 240.

The control module 210 is supplied with constant power by way of connection 232 to the vehicle battery (not illustrated). In this manner, even when the ignition is turned off, the ECM 210 still has power for monitoring electrical systems and triggering alarms when any one of the systems is left on when the engine is turned off. For example, the electrical systems can include a headlight monitor 224, door ajar monitor 226, or other optional input switch.

The EPS 208 can be initiated when an ignition switch is activated to the "on" position. The EPS 208 can perform a self-test each time the system is initiated as described above. In operation, the engine protective system 208 can function to detect any variance from the predetermined safe parameter limits of operation as it relates to pressures, temperatures, or levels which would result in opening of the associated sensor switch to thereby effect closing of an alarm relay switch in the ECM 210 to thereby activate the associated visual and audible alarms. To prevent engine damage due to continued operation under alarm inducing conditions, the control module 210 will function to open a shut-down circuit connector 216, breaking current flow to the engine's system, including current flow to a solenoid of a fuel valve 290, when the interrupted current flow is of a predetermined duration. Such shut-down circuit breakers are well known in the arts and the specific type relied on forms no part of this invention; for instance, a simple time delay relay means or a thermocouple means may comprise such shut-down circuit connector 216.

Figure 6:
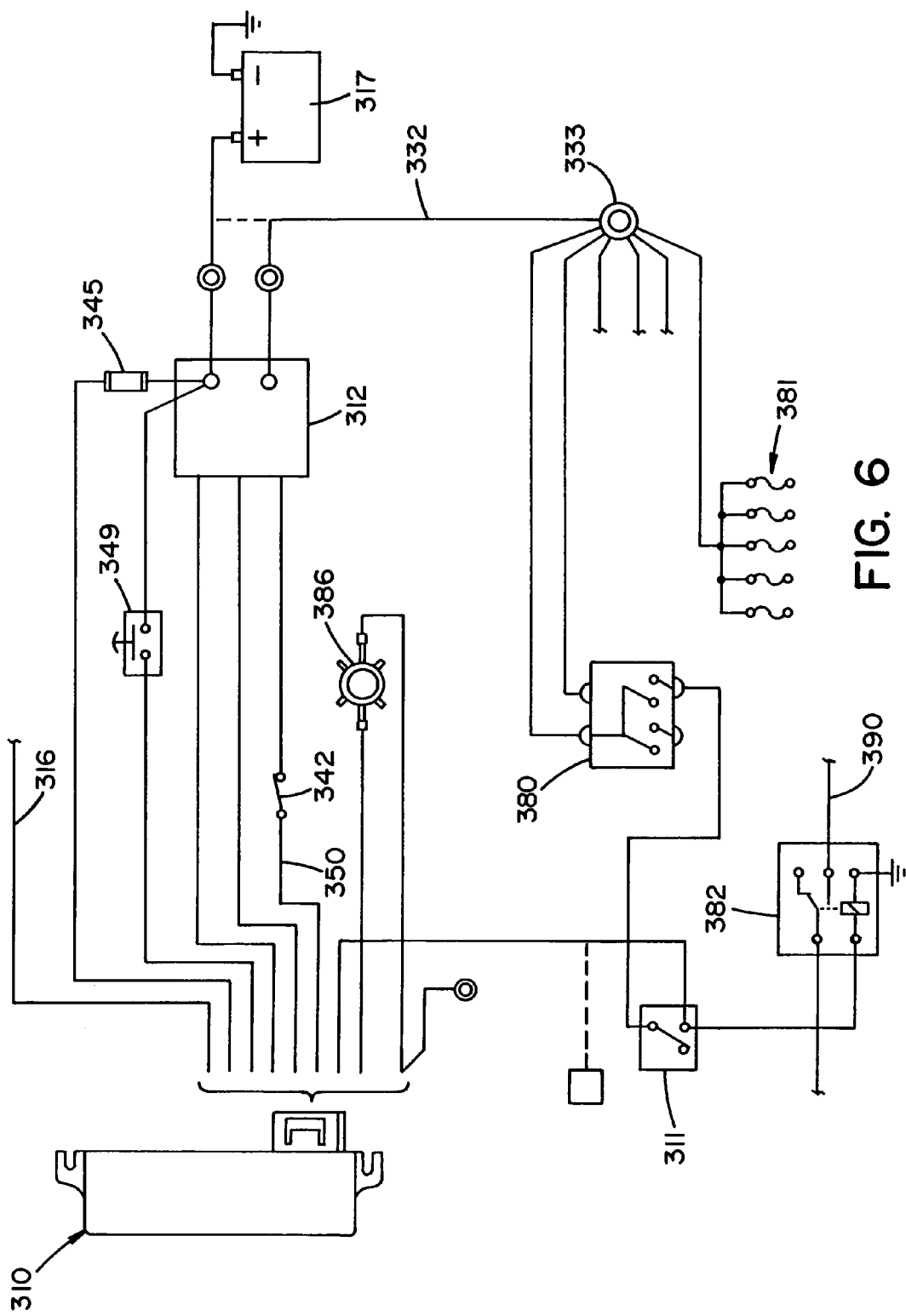

Referring now to FIG. 6, wherein another embodiment of a wiring diagram for an idle limiter 322 and battery supervisor monitor 337 is therein displayed integrated with an ECM 310. The ECM 310 can monitor the vehicle movements or lack thereof, through a transmission gear detector switch (i.e. "Park/Neutral") 311 or vehicle occupancy detector (not shown). The ECM 310 can activate a timer mechanism each time the vehicle becomes stationary. Stationary can be defined when the gear detector switch 311 is in park or neutral. The microprocessor of the ECM 310 can be programmed with a specified idle limit duration, for example, to a 5, 10, 15, etc. minute duration. When a vehicle remains idling and stationary for a period longer than the pre-programmed time, the ECM 310 microprocessor will send a signal to the shutdown connection 316 which will start the shut down sequence of the engine, for example, 30 seconds prior to actual engine shut down, as discussed above. The EIL 322 can include an ignition switch 380 connected to a fuse block 381. The ECM 310 and send a signal to a starter relay 382 which controls a solenoid 390 to the fuel supply when the idle duration has exceeded a predetermined time period. The EIL also includes a feed to a battery 317 through a connection 332 and a battery feed stud 333.

Referring again to FIG. 6, the battery supervisor monitor 337 and a latching relay 312 can be integrated with the ECM 310. The battery monitor 337 continually monitors the voltage of the main battery 317. As can be appreciated from the wiring diagram in FIG. 6, if the engine is shut down and the battery voltage drops below the specified limit, the latching relay 312 can shut off power to the electrical accessories. The ECM 310 can include a fail-safe or override circuit, through the use of the oil pressure switch circuit 342, 350. When oil pressure is detected, switch 342 can be opened which prevents the ECM 310 from disconnecting power to the electrical accessories, unless and until the vehicle's engine is turned off. Once the main battery 317 reaches a predetermined voltage or below, an audible alarm sounds and a battery warning light 386 may illuminate on the enunciator panel (not illustrated) for a period of approximately one minute, or any other predeterminable time period. If the voltage goes higher than the predetermined voltage within the one-minute time frame, the alarm and warning light 386 will shut off. If the engine is turned off and the voltage remains equal to or lower than the preset voltage, the ECM 310 will unlatch the relay allowing the power circuits to the electrical accessories to be interrupted. At that same time, the alarm will stop and the warning light 386 will change to a blink mode advising the driver that the system has been activated, relay unlatched, and the accessories turned off. At the point the relay 312 is unlatched, the main battery 317 retains adequate voltage to restart the vehicle, thus eliminating the need for a vehicle jump start caused by low battery voltage from the use of the accessory items while the vehicle's engine is not running. A fuse 345 can be is integrated with the ECM 310, thereby providing circuit protection when the current therein becomes excessive. A reset switch 349 can be integrated with the ECM 310 and the latching relay 312.

The invention has been described with reference to several embodiments. Obviously, modifications and alterations will occur to others upon a reading and understanding of this specification. One example of a modification is to provide components for the EPS capable of functioning with 24 volt vehicles. It is intended to include all such modifications and alterations insofar as they come within the scope of the appended claims and the equivalents thereof.

Having thus described the invention, it is claimed:

1. An engine protection system for an internal combustion engine associated with a vehicle, the system comprising:
   - an electronic engine control module;
   - means for monitoring duration of engine idling of a stationary vehicle;
   - means for determining whether a fault condition exists as to said engine idling by comparing said duration of said engine idling to a predeterminable number limit value; and,
   - said electronic control module including an engine shutdown connection, said shutdown connection disables the engine when said duration of said engine idling exceeds said predeterminable number limit.

2. The engine protection system of claim 1, wherein said electronic engine control module further includes an initial start-up override that suspends said means for monitoring duration of engine idling at initial start-up.

3. The engine protection system of claim 1, wherein said engine control module further includes a low ambient temperature override that suspends said means for monitoring duration of engine idling during periods of low ambient temperature.

4. The engine protection system of claim 1, wherein said engine control module further includes a high ambient temperature override that suspends said means for monitoring duration of engine idling during periods of high ambient temperature.

5. The engine protection system of claim 1, further comprising visual and audible signals on a panel monitor and said engine shutdown connection including a shutdown circuit connector that breaks current flow to a fuel valve.

6. The engine protection system of claim 1, wherein said electronic control module includes a microprocessor that records and retrieves said fault condition data.

7. The engine protection system of claim 1, further comprising means for monitoring the magnitude of a number of engine fluid parameters; and,
   - means for determining whether a fault condition exists as to one or more of said fluid parameters by comparing said magnitude of one each of said number of fluid parameters to a number of limit values corresponding to said one each of said fluid parameters.

8. The engine protection system of claim 7, further comprising visual and audible signals on a panel monitor and said engine shutdown connection including a shutdown circuit connector that breaks current flow to a fuel valve.

9. The engine protection system of claim 8, wherein said electronic control module includes a microprocessor for recording and storing said fault condition data.

10. The engine protection system of claim 9, including means for monitoring the magnitude of battery voltage; and,
    - means for determining whether a fault condition exists as to said battery voltage by comparing magnitude of said battery voltage to a number limit value.

11. The engine protection system of claim 10, including battery voltage protection means including a latching relay with circuit interrupter operative when said battery voltage is in said fault condition and said engine is shut down.

* * * * *